Feb. 12, 1963  A. J. SAMWAYS ETAL  3,077,065
SUSPENSION MOUNTING FOR ROTARY MOWERS
Filed Oct. 26, 1959  2 Sheets-Sheet 1

INVENTORS
ALFRED J. SAMWAYS
BYRON L. ERTSGAARD
By Williamson, Schroeder & Palmatier
ATTORNEYS Feb. 12, 1963 A. J. SAMWAYS ETAL 3,077,065
SUSPENSION MOUNTING FOR ROTARY MOWERS
Filed Oct. 26, 1959 2 Sheets-Sheet 2
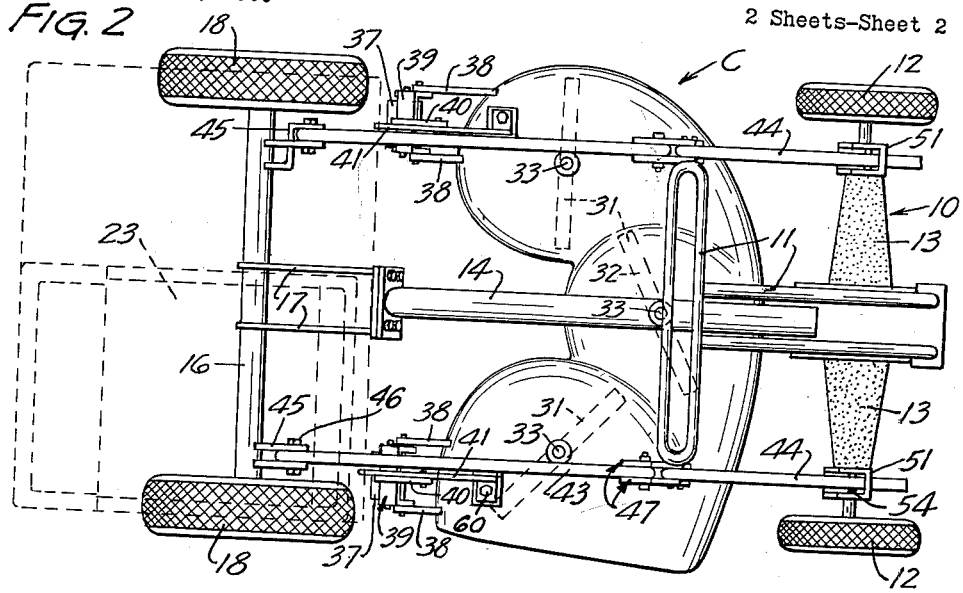
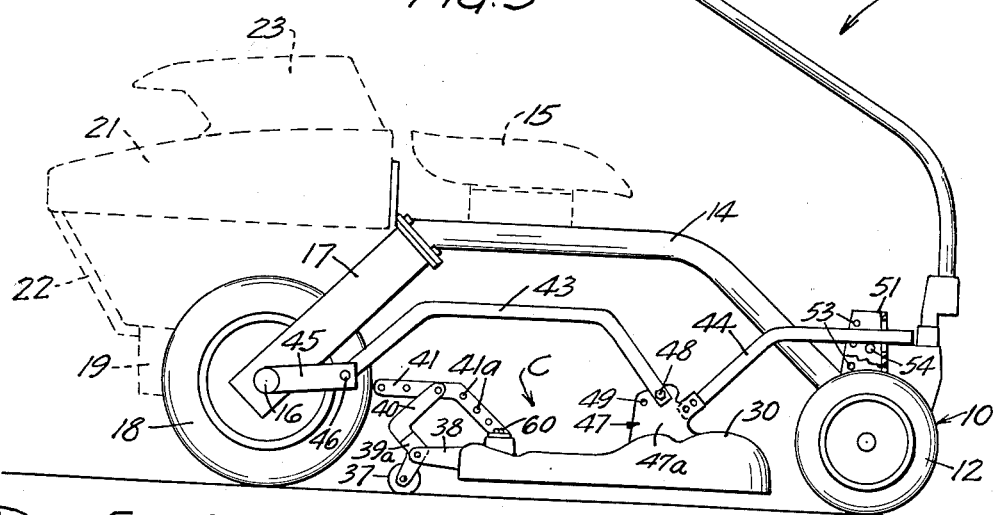
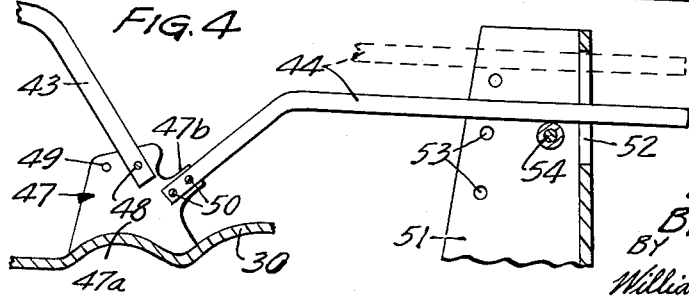
INVENTORS
ALFRED J. SAMWAYS
BYRON L. ERTSGAARD
BY
Williamson, Schroeder & Palmatier
ATTORNEYS

United States Patent Office 3,077,065
Patented Feb. 12, 1963

3,077,065
SUSPENSION MOUNTING FOR ROTARY MOWERS
Alfred J. Samways, Minneapolis, and Byron Louis Ertsgaard, Excelsior, Minn., assignors to Toro Manufacturing Corporation, Minneapolis, Minn., a corporation of Minnesota
Filed Oct. 26, 1959, Ser. No. 848,829
10 Claims. (Cl. 56—25.4)

This invention relates to ground traversing machines and the manner of suspending a ground engaging tool or implement therefrom, and in particular to means for suspending rotary cutters from the supporting carriage of a rotary power mower.

One of the most important problems associated with rotary mowers and particularly the larger vehicle or tractor mounted rotary mowers is that of providing an even uniform cut over irregularly contoured ground and to prevent scalping of the high spots and insufficient cutting in the low spots or depressions. To date, no one has, to applicants knowledge, devised or designed a rotary power mower which has successfully solved the problem of uniform even cutting of grass over irregularly contoured ground.

In rotary power mowers previously and presently available, the cutting unit including the cutter housing and cutter blades mounted for rotation therewithin have been mounted on the mobile supporting frame or carriage in such fashion that the relative relationship between the cutting unit and the supporting frame is fixed so that the disposition of the cutting unit with respect to the ground being traversed thereby is directly controlled and established by the relative disposition of the supporting frame with respect to the ground upon which it rests. Thus, in the prior art mowers, the entire cutting unit is not free to move up and down independently of the supporting frame and therefore is not capable of accurately conforming to the undulations and irregularities of the ground contours over which the cutting unit passes. Some of the prior art devices have attempted to alleviate this situation by pivotally mounting the cutting unit for tilting movement about a fixed axis which is immovable with respect to the supporting frame. Such devices have proven only partially successful and are incapable of accomplishing a uniformity of cut to the degree and extent desired over relatively large expanses of lawn having the customary ground swells and depressions usually associated therewith, their failure being attributed primarily to the lack of freedom of movement of said cutting unit necessary to enable the cutting units to accurately trace and uniformly cut rolling undulating expanses of lawn.

Therefore, an important object of our invention is a rotary power mower which is relatively simple in design and construction and which is capable of accomplishing a substantially uniform cut over irregularly contoured ground and which substantially eliminates the possibility of scalping under normal conditions.

Still another object is a novel method of suspending the cutting mechanism from a supporting carriage or chassis which provides a floating suspension for the cutting unit to enable the cutting unit to closely follow the ground contours including longitudinal and transverse undulations covered thereby to achieve a uniform cut thereover.

Another object is a suspension system for the cutting unit of a rotary power mower which provides a freedom of movement for said cutting unit independently of the supporting carriage therefore not previously or presently available, said freedom of movement including free vertical displacement and the ability to assume any inclination necessary to conform to the changing contours being traversed, said freedom of movement enabling the cutting unit to freely, accurately and independently trace the ground immediately therebelow and between the front and rear wheels to fluctuate and weave in any fashion necessitated by the undulating terrain to enable the cutting unit to remain substantially parallel to the terrain therebelow at all times to evenly cut the same.

Still another object is a rotary power mower of the class described having a cutting unit freely suspended therefrom which automatically and instantaneously accommodates or adjusts itself to the changing ground contours immediately therebelow so as to remain substantially parallel thereto at all times and cut the grass to a substantially uniform predetermined height.

Still another object is a rotary power mower of the class described in which each side of the cutting unit is free to rise or fall with respect to the other side without causing corresponding movement of said other side and without interference from the supporting frame or carriage.

Still another object is a rotary power mower of the class described in which the cutting unit is adapted to engage and trace the ground and is free to assume innumerable inclined attitudes relative to the horizontal in which the plane of the cutting unit is diagonally disposed with respect to the horizontal and may be longitudinally, transversely or obliquely disposed with respect to the direction of movement.

Another object is a novel suspension system for rotary power mowers of the class described wherein the cutting unit is freely suspended from the supporting carriage in a manner which not only permits the cutting unit to alter its position to conform to the more extensive variations and undulations of the terrain being traversed which simultaneously effect both the carriage and the cutting unit, but also enables the cutting unit to automatically shift its position to the most favorable attitude or inclination when encountering changes in ground elevation of relatively short expanse disposed between the front and back wheels of the carriage and momentarily disturbing both sides or a single side of the cutting unit.

Still another object is a rotary power mower of the class described having a novel system for suspending the cutting unit from the supporting carriage which enables the cutting unit to respond to and change position as dictated by the movements of the front wheels and its own independent engagement with the ground contours while remaining unresponsive to the movements of the rear wheels of said carriage.

Still another object is a rotary power mower of the class described having front and rear traction wheels in which the cutting unit is suspended from the supporting frame and between the front and rear wheels thereof which is free to tilt back and forth and from side to side with respect to and independently of the supporting frame.

Still another object is a novel suspension system of the class described which not only provides a free floating action therefor to accomplish a degree of uniform cutting not possible with structures presently available but also permits the cutting unit to be readily adjusted to a number of vertical positions to vary the depth of cut to the height desired.

Still another object is a suspension system of the class described which is readily mountable and dismountable on the supporting carriage or chassis.

These and other objects and advantages of my invention will more readily appear from the following description made in connection with the accompanying drawings wherein like reference characters refer to the same or similar parts throughout the several views, and in which:

FIG. 2 is a top plan view of the apparatus of FIG. 1 with portions thereof removed to provide a better view of our suspension system;

FIG. 3 is a side elevational view of the apparatus of FIG. 1 with portions thereof removed for clarity of understanding;

FIG. 4 is a detail elevational view on an enlarged scale of the suspension system;

Figure 1:
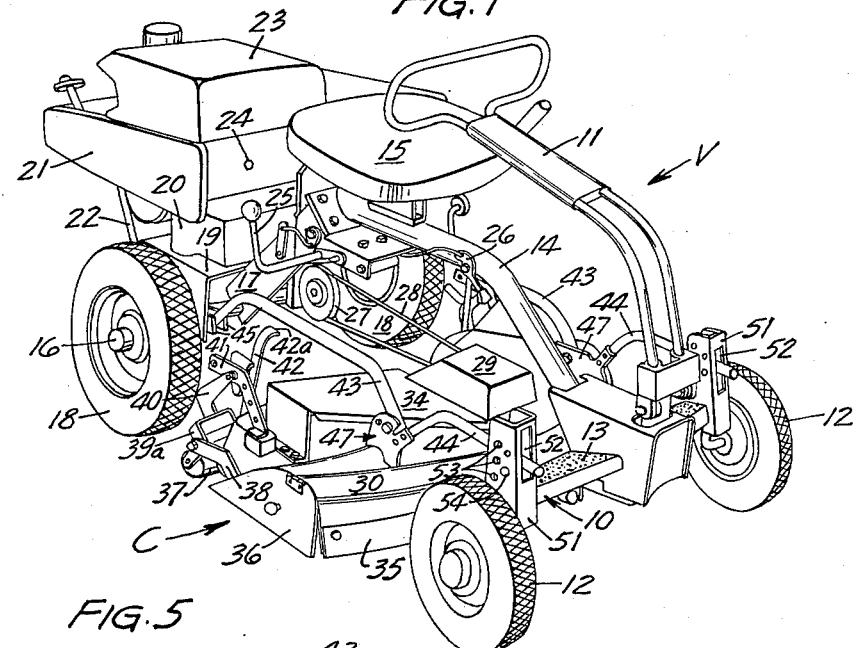
FIG. 1 is a perspective view of a self-propelled vehicle mounted rotary power mower employing the suspension system of our invention.

Reference is now made to the drawings for a more detailed description of our invention. Reference is first made to FIG. 1 wherein a mobile carriage, supporting frame or vehicle indicated generally by the letter V is shown with a cutting unit indicated generally by C suspended therefrom and adapted to traverse the ground in close spaced relationship therewith.

The vehicle V includes a pivotally mounted front axle unit indicated in the entirety by 10, said axle unit 10 having mounted thereon a steering handle 11 and a pair of suitable front traction wheels 12. The axle unit 10 is also provided with a pair of rearwardly and downwardly inclined foot rest portions 13. The vehicle is provided with a bent elongate center or frame member 14 which has a suitable seat 15 mounted thereon, the forward end of said frame member 14 having the front axle unit pivotally mounted thereon for steering purposes, the rear end of which is connected to the rear axle 16 by means of a rigid upwardly inclined frame member 17, the rear axle having a pair of suitable propulsion wheels 18 mounted on the ends thereof. A motor mounting bracket 19 is mounted on the rear axle 16 upon which is mounted a suitable gas operated engine 20, a portion of which is enclosed by a horizontally disposed rear shroud member 21 which is supported above the axle by means of a diagonally disposed bracing member 22 connected to the bracket 19. The top of the engine is enclosed by a motor or engine shroud 23 which is mounted on and occupies approximately half of the rear shroud 21, the other half of the shroud providing a tray or platform useful for carrying small articles. A starting or ignition switch 24 is mounted on the front face of the shroud 21 within easy reach of the operator. A suitable cutter control arm or handle 25 and a throttle control 26 are also provided within easy reach of the operator.

The vehicle is also provided with suitable drive and gear mechanism (not shown) which is adapted to transmit power from the engine to the propulsion wheels and is also adapted to drive a suitable sheave or pulley 27 which is in turn adapted to drive the rotary cutters through the medium of a suitable detachable drive belt 28, which is trained about the sheave 27 and a suitable drive pulley (not shown) which is housed in a front shroud 29 mounted on the cutting unit.

The cutting unit C includes a large elongate inverted generally horizontal rigid shallow housing 30 transversely disposed to the line of travel and having a pair of side cutter blades 31 and a front cutter blade 32 mounted on suitable spindles or drive shafts 33 which are generally vertically disposed with respect to the housing 30, the front cutter blade 32 being positioned to span the uncut area between the side cutter blades 31. The spindles or drive shafts 33 extend above the housing 30 and are enclosed in a suitable housing 34 which also encloses suitable mechanism (not shown) for transmitting driving power from the drive pulley enclosed in the front shroud 29 to the spindles 33. The main housing 30 is also provided with a vertically adjustable protective guard 35 on the front of said cutter housing and is also provided with a pair of protective side skirts 36, the side skirts and front guards extending beneath the lower edge of the cutter housing 30 to intercept any objects such as stones which might be thrown outwardly from the housing during operation thereof.

The cutter housing 30 is provided rearwardly with a pair of guide rollers 37 disposed on each side thereof which rollers are pivotally or swingably mounted with respect to said housing by means of a pair of rearwardly extending mounting arms 38 which are rigidly secured to the housing. The rollers are provided with suitable bifurcated mounting brackets 39 which include an upwardly and forwardly inclined control arm 40 and bell crank lever leg portions 39a which are pivotally mounted on the ends of the mounting arms 38 and pivotally support the rollers therebetween at the extreme lower ends thereof. Thus, the rollers may be swung or levered about the mounting arms 38 by swinging the control arm 40 back and forth in a vertical plane to selectively adjust and maintain the height of the rear end of the cutter housing above the ground and control the depth of cut thereby.

The cutter housing also has mounted thereon a rearwardly extending dog leg member 41 secured to the housing by fastening means 60 which is provided with a series of suitable apertures 41a which are adapted to engage a transverse catch pin carried on the outer end of the control arm 40 to hold the arm 40 at predetermined angles to control the depth of cut of the cutting mechanism. The rear end of the housing is also provided with a pair of upstanding hanger elements 42 having curved or hooked upper portions 42a by which the back of the cutter housing 30 may be raised from ground engagement and suspended from the suspension unit hereinafter to be described when the cutter is not in operation as when traveling along the highway, etc.

The leading edge of the housing is preferably disposed adjacent to and closely behind the front wheels 12 so that the leading edge of the housing will be vertically displaced almost simultaneously with the front wheels through substantially the same amount of displacement when the front wheels rise or fall, thereby avoiding scalping as the front wheels pass over high spots in the ground.

The cutter housing 30 is removably suspended from the vehicle on each side of the longitudinal center line thereof by means of a pair of identical suspending units, each of which includes an elongate downwardly bowed push or thrust rod 43 and a bent dog leg support or suspension rod 44, which rods 43 and 44 in the form shown are longitudinally aligned with respect to each other and with respect to the longitudinal axis of the supporting vehicle and the line of travel. The rear ends of the push rods 43 are connected to the rear axle 16 by means of suitable bifurcated mounting brackets 45 which are rigidly secured to the rear axle and extend forwardly therefrom. The rear end of the push rods 43 are disposed between the bifurcated portions of the brackets 45 and are pivotally connected thereto for swinging movement about a horizontal transverse axis by means of a detachable mounting or pivot pin 46 which may be detachably held in place by means of any suitable fastening element such as a cotter type hair pin.

Each side of the housing is provided with a pair of vertical mounting flanges 47 which are rigidly affixed to the top of the cutter housing 30 and are preferably disposed forwardly of the center of gravity of said housing 30. The forward end of the push rods 43 are disposed between the main body portion 47a of the vertical flanges 47 and are pivotally secured thereto by means of a horizontal transversely disposed mounting or pivot pin 48. The main portion of the flanges 47 adapted to receive the front of the push rods 43 therebetween are provided with a pair of longitudinally spaced apertures 49 for receiving the pivot pins 48 which permit longitudinal adjustment of the cutter housing to provide the proper tension for the drive belt 28 which may stretch and cause belt slack during use. Therefore, as the belt 28 wears and slackens, the push rods 43 are connected to a more rearward aperture 49 to move the cutter housing forward with respect thereto and take up the slack in the drive belt.

The rear end of the supporting or suspension rods 44 are securely and rigidly fastened between the vertical housing flanges 47 between the upwardly and forwardly inclined branches 47b thereof by means of a pair of suitable fastening elements such as the mounting screws 50 which rigidly secure the supporting rods 44 to the vertical flanges and the housing. The leading end portions of the supporting rods 44 are adapted to be supported by means of a pair of vertically disposed channel members 51 which are mounted on the front axle 10. The front face of the channels 51 are provided with elongate vertically disposed rod receiving slots 52, the rods being freely movable up and down in said slots 52. The sides of the channels 51 are provided with a series of staggered vertically spaced apertures 53 which are adapted to receive a rod supporting pin 54, on which the bottoms of the leading end portions of the suspension rods 44 freely rest in mounted condition, the rods 44 being freely slidable back and forth on the supporting pins 54, and free to slidably swing thereabout. The apertures 53 are adapted to adjust the height of the cutter housing above the ground in cooperation with the apertures 41a provided in the member 41 mounted rearwardly of the housing. Thus, the rearwardmost aperture 41a of the member 41 and the topmost of the apertures 53 are set to position the cutter housing for the maximum height of cut and the succeeding apertures 41a and 53 are adapted to successively lower the cutter housing, the lower and forwardmost of the apertures 41a on the member 41 cooperating with the lowest of the apertures 53 to maintain the cutter housing at its lowest setting for the shortest cut desired.

Thus, the cutter housing is propelled or pushed simultaneously with the vehicle by the push rods 43 and are suspended above the ground by means of the suspension or support rods 44 in cooperation with the rollers 37. Because of the pivotal connection between the push rods 43 and the mounting brackets rearwardly and their pivotal connection with the cutter housing forwardly for vertical swinging movement of the rods 43, together with the free movement of the support rods 44 with respect to their supporting pins 54, the cutter housing 30 is adapted for free floating movement as it traverses the ground to enable it to automatically assume the contour of the ground as it passes thereover. Thus, the front of the cutter unit responds directly to the vertical movement of the front wheels in an up or down direction to assume the inclined or declined contour of that portion of the ground immediately preceding the cutters and being traversed by the front wheels. This suspension system also permits the cutter housing and the cutters to be unresponsive to the vertical up and down movements of the rear wheels so that the desired parallel relationship between the cutters and the ground overlain thereby is not disturbed by the movement of the rear wheels passing over terrain already traversed by the cutters. This arrangement also permits free vertical movement of the cutter housing independently of the supporting carriage within the limits normally desired or necessary in response to the irregular contours of the ground engaged by the cutter housing rollers. Thus, the push rods and the suspension rods are free to automatically adjust to the movement of the cutter housing effected by the rollers as they engage the ground. The push rods 43 prevent longitudinal or transverse shifting or movement of the cutter housing while propelling the same and guiding the generally vertical movements of the housing when raised or lowered by the engagement of the rollers with the ground being traversed. The suspension rods 44 support the leading end of the housing above the ground and function also as a lever arm of variable length, the supporting pins 54 acting as the fulcrum therefor, the rods 44 cooperating with the rollers 37 to establish the horizontal or inclined attitude of the housing at any given moment. Thus, due to the rigid connection between the cutter housing and the suspension rods 44, the rods 44 and housing cooperate to function together as a lever arm of variable length with the supporting pins 54 functioning as the fulcrum therefor, the length of said lever arm being represented by the distance from the rollers to the pins 54 at any moment, the lever arm moving in a vertical plane in guided fashion on a path determined by the push rods 43.

The cutter housing is also free to tilt from side to side about longitudinal axes passing through or intersecting either of the rollers. Within the variations in ground contour which are normally present and can reasonably be expected, both of the guide rollers 37 are in contact with the ground at all times, their relative positions being determined by and varying according to the contour of the ground being traversed thereby. Therefore, due to the pivotal relationship between the push rods 43 and the sulky or vehicle V and cutter housing, and the freedom of movement provided by the suspension rods 44, the cutter housing may assume an almost innumerable number of angular relationships or attitudes with respect to the sulky and the horizontal which enables the cutter to automatically and almost instantaneously change its position to adjust itself to the changing ground contours, regardless of whether the swells and depressions be disposed transversely, longitudinally or diagonally to the line of travel and regardless of what combination of surface deviations are encountered at any particular moment.

The suspension system herein disclosed provides for at least three points of suspension for the cutter housing represented by the two rollers 37 and the two suspension rod supporting pins 54, any three of which are sufficient to fix the position of the cutter housing at any moment. Since in normal usage the two guide rollers 37 are always in contact with the ground, the ultimate angular disposition of the cutter housing at any given moment is determined by the relative elevations between the rollers and by which of the two supporting pins 54 is at the highest elevation with respect to its corresponding roller or rollers on the same side, the third point of suspension being that of the pin 54 having the greatest elevational differential from which its respective supporting rod 44 would be suspended, the other rod 44 being unsupported at the particular moment unless the two pins 54 have the same elevational differential. This enables the cutter housing to maintain a uniform distance or height above the ground being traversed including not only those situations where the front wheels and guide rollers successively traverse transverse swells or depressions simultaneously and where the front wheel and guide roller on the same side simultaneously traverse a longitudinal depression or ridge, but also permits the cutter housing to respond and adjust its position when either of the guide rollers individually rises or falls or when either of the front wheels individually rises. In those situations where one of the front wheels suddenly encounters a sharp decline in elevation such as a chuck-hole or the like and falls therein, the three point suspension provided by the pin 54 on the opposite side and the rollers will maintain the position of the cutter housing and prevent the corner thereof adjacent the falling wheel from dipping correspondingly, thereby preventing scalping and possible gouging of the ground by the housing in such a situation.

Figure 5:
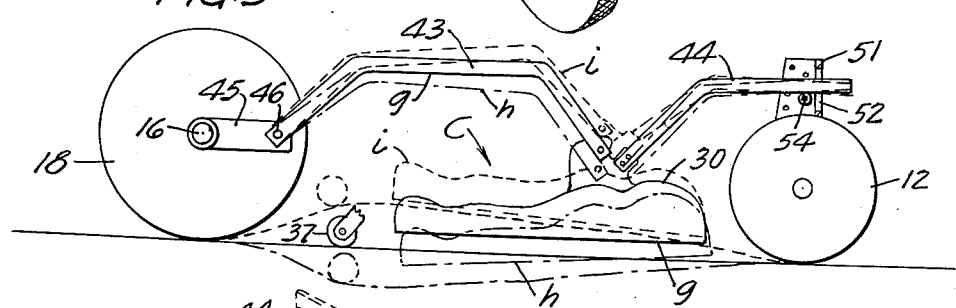
FIG. 5 is a diagrammatic side elevational view of the manner of our invention illustrating some of the movements and various positions which the cutting unit may assume in passing over terrain of varying contour.

It will be noted in FIG. 5 that during each change of position, the entire cutter housing rises and falls in accordance with the ground conditions to accurately assume an attitude substantially parallel thereto, and does not simply swing about a fixed axis as in prior art devices.

Figure 6:
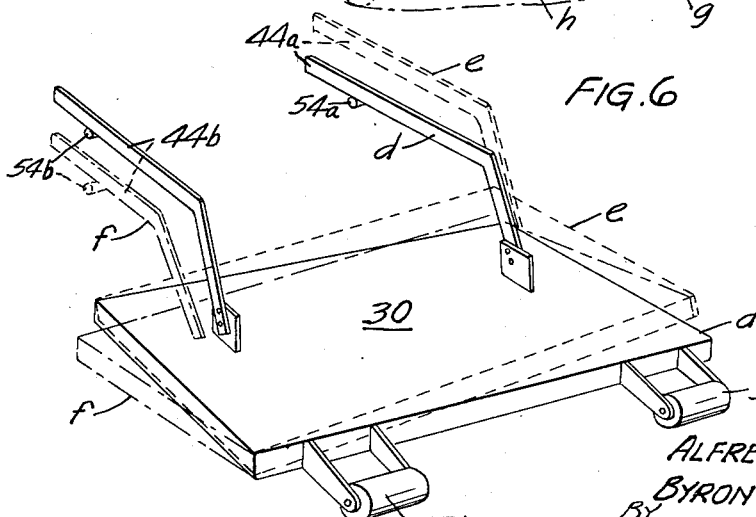
FIG. 6 is a diagrammatic perspective view of the cutting unit illustrating several of the inclined attitudes which it may assume when encountering certain changes in terrain.

FIG. 6 illustrates two situations in which the rollers are at different elevations due to one of the rollers encountering a ground swell not encountered by the other roller, causing one side of the cutter housing to be raised. The solid line position d of FIG. 6 illustrates the cutter housing in horizontal position, with the rollers being at the same elevation, it being understood that the positioning of the supporting pins is determined by and directly related to the positions and movements of the front wheels.

The broken line position e of FIG. 6 illustrates a situation in which the cutter housing changes its horizontal attitude of solid line d due to the right guide roller 37a encountering a rise while the front wheels (and the supporting pins) and the other guide roller 37b remain at and maintain the same elevations as in solid line horizontal position d. In such instance, the entire right side of the cutter housing rises or tilts upwardly, including the suspension rod 44a, to the inclined position shown, the left roller 37b remaining engaged with the ground, the left suspension rod 44b remaining supported on the left supporting pin 54b, the right roller 37a resting on the ground rise or swell, and the right suspension rod 44a being lifted off of its supporting pin 54a and unsupported until the housing again changes position. Thus, in position e, the housing is, in effect, tilting about a longitudinal axis passing through the left side or left roller 37b and lying in a plane inclined to the horizontal and parallel to the line of travel, the front and back corners on the left side being at the same elevation, and the front and back corners on the right side being at the same elevation with respect to each other but at a higher elevation than the left side of the housing.

Broken line position f illustrates a situation in which the cutter housing assumes an attitude which is inclined to the horizontal and diagonal to the line of travel. In this situation, rollers are at different elevations with respect to each other and the front wheels (and the supporting pins) are also at different elevations with respect to each other, the left front wheel and supporting pin being lower than those on the right. To facilitate comparison in FIG. 6, the left roller 37b and the right supporting pin 54a remain in the same location for all three positions d, e and f. The right hand roller 37a maintains the same elevation for positions e and f. Thus, in broken line position f, the right roller 37a is higher than left roller 37b, and left supporting pin 54b has dropped to an elevation below right supporting pin 54a. Therefore, in this situation, the housing is supported rearwardly by the rollers resting on the ground and forwardly by the suspension rod 44a resting on supporting pin 54a, the left rod 44b being unsupported. Thus, in position f, the four corners of the cutter housing are all disposed at different elevations with respect to one another, the housing thereby assuming the inclined diagonal position previously indicated. It will be understood, of course, that the positions illustrated in FIGS. 5 and 6 are merely illustrative of seevral of the many positions which the cutter housing may assume in traversing irregularly contoured terrain, and is not limited in any way thereto.

Reference is again made to FIG. 5, which diagrammatically illustrates hte free vertical movement which the cutter housing 30 is capable of. The solid line position g illustrates the position of the cutter housing 30, push rods 43, and suspension rods 44 when the mower is traversing level terrain. Broken line position h illustrates the attitudes of the cutter housing and rods 43 and 44 when the cutter unit is traversing a transversely extending depression located between the front and rear wheels. Broken line position i illustrates the position of the housing and rods when the cutter unit is traversing a transversely extending ground swell or rise intermediate the front and rear wheels of the vehicle. It will be noted that the entire cutter unit, including the housing and the rods 43 and 44, moves up or down according to the changes in ground contour encountered by the ground engaging rollers 37 carried thereby.

From the foregoing description, the advantages of our invention are readily apparent. The novel suspension system employed and disclosed heerin provides the cutter unit with a freedom of movement and variataion in angulation not possible in prior art and presently available devices which enables the cutters to readily and accurately adjust themselves to the changing contours of the undulating ground being traversed thereby to achieved a uniformity of cut thereover not previously possible. In addition, the cutting unit is capable of being quickly mounted on and demounted from the supporting carriage or sulky with a minimum of effort and time required, and the height of cut of the cutter is readily adjusted to any height desired by simply adjusting the rollers by varying the angle of the control arms 40 and by adjusting the height of the supporting rods 44 by selectively varying the position of the supporting pins 54.

It will, of course, be understood that various changes may be made in the form, details, arrangement and proportions of the various parts without departing from the scope of our invention.

What we claim is:

1. In a rotary power mower including a mobile carriage and a cutting unit including a shallow generally horizontal housing adapted for travel over the ground in close spaced relation thereto having rotary cutting means mounted for rotation therewithin and having ground engaging means mounted rearwardly thereof with respect to the normal direction of travel for maintaining the trailing end portion of said housing a uniform distance above the ground, link means drivingly interconnecting said housing and said carriage for substantially simultaneous ground traversing movement thereof and permitting free vertical movement and swinging movement about a horizontal transverse axis of said housing with respect to said carriage, and means suspending the leading portion of said housing from said carriage a minimum predetermined height above the ground, and permitting free upward movement of said leading portion of said housing with respect to said carriage.

2. In a rotary power mower including a mobile carriage and a cutting unit including a shallow generally horizontal housing adapted for travel over the ground in close spaced relation thereto having rotary cutting means mounted for rotation therewithin, said housing having leading and trailing portions with respect to the direction of travel, ground engaging means carried by one of said portions maintaining said portion a substantially uniform height above the ground being traversed, means for mounting said cutting unit in suspended relationship from said carriage including an elongate drive member having one end thereof pivotally connected to the carriage and the other end pivotally connected to said housing permitting free vertical swinging movement therebetween about a horizontal transverse axis while effecting simultaneous ground traversing movement of said carriage and said housing, and an elongate suspension member having one end thereof rigidly connected to the other portion of said housing, the other end of said suspension member freely resting on said carriage and vertically and longitudinally movable with respect thereto and swingable thereabout about a horizontal transverse axis and adapted to maintain said other portion of said housing a minimum predetermined height above the ground.

3. In a rotary power mower, a carriage having front and rear traction wheels mobilely supporting said carriage for travel over the ground, a cutting unit including an inverted generally horizontal shallow housing and rotary cutter means adapted for rotation therewithin and having ground engaging means mounted on the back portion of said housing and maintaining said back portion a predetermined distance above the ground, and means for suspending said cutting unit from said carriage and between said front and rear wheels, said means comprising a pair of suspension units disposed one on each side of said housing, each of said suspension units including an elongate suspension member rigidly connected at one end thereof to said housing and having its other end extending generally forwardly and freely resting on a supporting element carried by the front end of said carriage, said member cooperating with said ground engaging means to maintain said housing a minimum distance above the ground, said member also being vertically and longitudinally movable with respect to said supporting element and swingable about a horizontal transverse axis to enable said housing to freely trace the contours of the ground being traversed thereby, and an elongate thrust member pivotally connected at one end to the rear of said carriage and pivotally connected at its other end to said housing to propell the same simultaneously with said carriage, said pivotal connections providing relative pivotal movement about horizontal transverse axes.

4. In a rotary power mower of the type including a supporting carriage provided with front and rear wheels for travel over the ground and a cutting unit including a cutter housing and cutter blades mounted for rotation therewithin suspended from said carriage between said front and rear wheels and having ground engaging means carried by the trailing end of said housing for maintaining the housing a predetermined height above the ground, a suspension system for freely suspending said cutting unit from said carriage enabling said cutting unit to change its position in conformance with the changing contours of the ground being traversed thereby, said system comprising a suspending unit disposed on each side of the longitudinal center line of said housing, each of said suspending units comprising an elongate longitudinally disposed suspension member having one end thereof secured to the cutter housing and the other end thereof supported on the front end of said carriage by a stationary supporting element carried thereon which maintains said housing a minimum height above the ground, said suspension member being movable vertically and longitudinally with respect to said supporting element and slidingly swingable about a horizontal transverse axis to permit vertical movement of said cutter housing with respect to said carriage, and a vertically movable impelling member interconnecting said housing and said carriage for simultaneous ground traversing movement of said housing and said carriage.

5. In a rotary power mower including a supporting carriage and a cutting unit including a generally horizontally disposed cutter housing adapted for travel over the ground in close spaced relation thereto having leading and trailing end portions and having rotary cutting means mounted for rotation therewithin and having ground engaging means supporting one end portion of said housing a predetermined height above the ground being traversed thereby, means for suspending said cutting unit from said carriage including elongate suspension means rigidly connected to said housing and supported by said carriage maintaining the other end portion of said housing a predetermined height above the ground, said housing and said elongate suspension means operating as a unit and being swingable about a horizontal transverse axis and vertically movable with respect to said carriage, and vertically swingable elongate connecting means interconnecting said carriage and said housing limiting relative longitudinal movement therebetween and providing for simultaneous ground traversing movement thereof and guiding said unit along a predetermined path of movement when raised or lowered with respect to said carriage.

6. In a rotary power mower including a mobile carriage having front and rear ground engaging wheels and a cutting unit suspended from said carriage between said wheels and including a generally horizontal housing adapted for travel over the ground in close spaced relation thereto having rotary cutting means mounted for rotation therewithin and ground engaging means supporting the trailing end of said housing a predetermined height above the ground, means for mounting said cutting unit on said carriage comprising means suspending the leading end of said housing from the front end of said carriage a predetermined height above the ground, said housing being directly responsive to the vertical movements of the front end of said carriage and independently movable up and down with respect thereto and swingable about a horizontal transverse axis, and means interconnecting said housing and said carriage for simultaneous ground traversing movement thereof limiting relative longitudinal movement therebetween.

7. In a rotary power mower including a mobile carriage adapted for travel over the ground and having spaced apart front wheels on each side thereof and rear wheels and a cutting unit suspended from said carriage intermediate the front and rear wheels and including a generally horizontal housing adapted for travel over the ground in close spaced relation thereto having rotary cutting means mounted for rotation therewithin and ground engaging means carried by said housing supporting the trailing end of said housing a predetermined height above the ground, means for mounting said cutting unit on said carriage comprising elongate suspending members disposed on each side of the longitudinal center line of said carriage and housing and having the rear ends thereof rigidly secured to said housing, supporting elements carried by the front end of said carriage for supporting the suspending members thereon, the front end portions of said members adapted to freely rest on said supporting elements to maintain the leading end portion of said housing a predetermined height above the ground, said suspending members being vertically movable and freely slidable with respect to said supporting elements and swingable with respect thereto about a horizontal transverse axis, and vertically movable link means having said housing mounted thereon for swinging movement about a horizontal transverse axis and interconnecting said housing and said carriage for simultaneous ground traversing movement thereof and limiting the relative longitudinal movement therebetween.

8. In a rotary power mower including a mobile carriage adapted for travel over the ground and having spaced apart front wheels on each side thereof and rear wheels and a cutting unit suspended from said carriage intermediate the front and rear wheels and including a generally horizontal housing adapted for travel over the ground in close spaced relation thereto having rotary cutting means mounted for rotation therewithin and ground engaging means carried by said housing supporting the trailing end of said housing a predetermined height above the ground, means for suspending the leading end portion of said cutting unit above the ground being traversed from said carriage comprising elongate suspension members disposed on opposite sides of the longitudinal center line of said carriage, said members being integrally united with said housing for simultaneous movement therewith, rest elements carried by said carriage upon which said members are adapted to freely rest to suspend said members and housing therefrom, said members and elements being adapted for free relative vertical and longitudinal movement therebetween, and generally elongate thrust members extending between said housing and said carriage and pivotally interconnected with each for relative pivotal movement therebetween about a horizontal transverse axis.

9. In a power mower having a mobile front and back wheeled chassis and a cutter unit, means for mounting said cutter unit between the front and back wheels comprising ground engaging means mounted rearwardly on said cutter unit for maintaining the rear end of said unit above the ground, an elongate thrust member interconnecting said cutter unit and the rear of said chassis and pivotally connected to both for relative pivotal movement therebetween about horizontal transverse axes, and an elongate rigid suspension member for suspending said cutter unit from the front of said chassis and maintaining the front end of said unit above the ground, said suspension member having one end thereof fixedly secured to said cutter unit, and rest means on the front end of said chassis for supporting the other end of said suspension member, said suspension member resting freely on said rest means and capable of free vertical and longitudinal movement relative thereto and capable of swinging movement relative thereto about a horizontal tranverse axis.

10. In a power mower having a mobile front and back wheeled chassis and a cutter unit, means for mounting said cutter unit between the front and back wheels comprising ground engaging means mounted rearwardly on said cutter unit for maintaining the rear end of said unit above the ground, thrust means interconnecting said unit and said chassis, said thrust means being pivotally connected to said unit for swinging movement thereof about a horizontal transverse axis, said thrust means being capable of free vertical movement relative to said chassis, and an elongate rigid suspension member for suspending said cutter unit from the front of said chassis and maintaining the front end of said unit above the ground, said suspension member having one end thereof fixedly secured to said cutter unit, and rest means on the front of said chassis for supporting the other end of said suspension member, said suspension member resting freely on said rest means and capable of free vertical and longitudinal movement relative thereto and capable of swinging movement relative thereto about a horizontal transverse axis.

References Cited in the file of this patent
UNITED STATES PATENTS

| | | |
|---|---|---|
| 1,904,376 | Kruckemeyer | Apr. 18, 1933 |
| 2,283,269 | Krenzke | May 19, 1942 |
| 2,589,845 | Mott | Mar. 18, 1952 |
| 2,688,833 | Weiss et al. | Sept. 14, 1954 |
| 2,711,624 | Crump | June 28, 1955 |
| 2,924,928 | Rhoades et al. | Feb. 16, 1960 |
| 2,971,314 | Lewis | Feb. 14, 1961 |
| 2,972,218 | Benson | Feb. 21, 1961 |
| 2,972,850 | Ariens et al. | Feb. 28, 1961 |